United States Patent Office 3,840,470
Patented Oct. 8, 1974

3,840,470
IMPROVED ORGANOMETALLIC COMPOUND-HALOGENATED TRANSITION METAL-SUPPORT CATALYST FOR POLYMERIZING AND COPOLYMERIZING OLEFINS
Ferdinando Ligorati, Milan, Paolo Colombo, Saronno, and Marco Galliverti, Legnano, Italy, assignors to Società Italiana Resine S.I.R. S.p.A., Milan, Italy
No Drawing. Filed Dec. 27, 1972, Ser. No. 318,796
Claims priority, application Italy, Dec. 27, 1971, 32,950/71
Int. Cl. B01j 11/84
U.S. Cl. 252—429 C                      9 Claims

ABSTRACT OF THE DISCLOSURE

Catalysts for polymerisation of ethylene and other olefins comprise an organo-metallic compound and the products of interaction between a halogenated compound of a transition metal in the liquid state and a solid granular support, the said support being obtained by activation of a magnesium salt of an organic acid containing up to 5 molecules of crystallisation water, or a double alkali metal and magnesium salt of an organic acid containing up to 8 molecules of crystallisation water.

---

The present invention relates to a process for the preparation of polymers from ethylene and copolymers of ethylene and alpha olefins.

In another aspect, the invention relates to improved catalysts suitable for the polymerisation and copolymerisation of olefins, and to a process for the preparation of such catalysts. It is already known that the polymers and copolymers of olefins and particularly those of ethylene may be obtained by polymerising the monomers with Ziegler type catalysts.

Such catalysts are normally obtained by bringing into contact compounds of the transition metals with metals, hydrides or organo-metallic derivatives of the elements belonging to Groups IA, IIB and IIIB of the periodic system.

More recently, catalysts have been developed for the polymerisation and copolymerisation of olefins, comprising an organo-metallic compound and the product of interaction of a halogenated compound of a transition metal in the liquid state with a solid support.

However, the use of such catalysts involves a number of problems in that the form and physical and chemicophysical characteristics of the supports used in the preparation of the catalysts themselves have a considerable influence on the progress of polymerisation.

Particularly, there are a number of difficulties in obtaining supports of a regular crystalline structure and a uniform and constant granulometric distribution. It is known that the control of the crystalline structure and of the granulometric distribution of such supports is essential to the recovery of catalysts having uniform and reproducible characteristics, and thus is essential if polymeric products of defined and constant properties are to be obtained.

Thus, if there is a change in the crystalline structure and the granulometric distribution of the supports, polymers are obtained which have different properties, for example in the granulometry of the polymer itself; the homogeneity of the properties of the polymer, such as the molecular weight, the distribution of molecular weights, the percentage of branching and crystallinity.

It is therefore obvious that the use of a catalyst which is produced from a support of non-uniform characteristics and form makes it difficult on an industrial scale regularly to produce a polymer of clearly defined and constant properties.

The importance of a support in the catalysts described, particularly with regard to its nature and any possible activation treatments, will therefore be obvious.

It has now been found possible to eliminate or at least substantially to reduce the drawbacks of the prior art in connection with catalysts comprising an organo-metallic compound and the product of interaction between a halogenated compound of a transition metal in the liquid state and a solid granular support.

One object of the present invention is therefore a process for the preparation of supported catalysts which are highly active in the polymerisation of ethylene and in the copolymerisation of ethylene with alpha-olefins.

Another object of the present invention is a process for the preparation of catalysts suitable for the production of polymers of ethylene and copolymers of ethylene with alpha-olefins, of definite and uniform characteristics. A further object of the present invention is the process for the production of ethylene polymers and of copolymers of ethylene with alpha-olefins using the said catalysts. Further objects of the invention will become manifest from the following description.

The catalysts according to the present invention comprise an organo-metallic compound and the products of interaction between a halogenated compound of a transition metal in the liquid state and a solid granular support, the said support being obtained by activation of a magnesium salt of an organic acid containing up to 5 molecules of crystallisation water, or a double alkali metal and magnesium salt of an organic acid containing up to 8 molecules of crystallisation water.

The essential aspect of the present invention is the use, as a solid granular support, of the product of activation of a magnesium salt of an organic acid containing up to 5 molecules of water of crystallisation or of a double alkali metal and magnesium salt of an organic acid containing up to 8 molecules of water of crystallisation. In particular, the magnesium salts used may be the oxalate, the formate, the lactate, the tartrate, the acetate, the benzoate and the citrate, whereas as double alkali metal and magnesium salts, the tartrate and oxalate may be used.

The said salts, which may be prepared according to processes known to men skilled in the art, are subjected to an activation process which resides essentially in gradually heating them in a stream of inert gas which is anhydrous or has a controlled humidity, at a temperature in any case below their point of decomposition, and in maintaining them at that temperature for a period of 5 to 50 hours.

Particularly favourable results are obtained when the heating of the salts is regulated in such a way that the gradient of temperature is comprised between 5 and 50° C. per hour up to the maximum temperature, after which this temperature is maintained for a period of 10 to 20 hours. Although the treatment times are not strictly critical, for the purposes of the present invention it is nevertheless essential that the temperatures, which have to be regulated as a function of the nature of the salt, be below the decomposition temperature of the salt itself, and preferably by at least 20 to 30° C.

Thus, in the case of magnesium oxalate, working temperatures range from 200 to 370° C., or 200 to 280° C. for the formate and 110 to 180° C. for the benzoate. The support may be treated in any form of inert gas atmosphere, particularly in the presence of nitrogen, helium, argon. Normally, the process is conducted in the presence of anhydrous inert gases, but good results are also obtained if there is a regulated moisture content not in any case exceeding a value corresponding to 10% by weight of saturation.

The treatment described may easily be conducted for example in rotary electric ovens and fluid bed type electric ovens fitted with a device to programme the rate of heating and to regulate the temperature.

By working in this way, it is possible to obtain supports of regular structure and of uniform and constant granulometric distribution, normally between 10 and 100 microns.

Such supports are particularly suitable for interaction with the halogenated transition compound in the liquid state, in the preparation of catalysts of high activity and of uniform and reproducible properties, for the polymerisation of ethylene and the copolymerisation of ethylene with alpha-olefines. The supports obtained may therefore be used according to prior techniques for the preparation of catalysts, comprising an organo-metallic compound and the product of interaction between a halogenated compound of a liquid transition metal and a solid support, suitable for the polymerisation of ethylene and of alpha-olefins. The liquid halogenated derivatives of transition metals which are caused to react with the support are chosen from among the chlorides, bromides and hydroxy-halides of metals of Groups IVB and VB of the periodic system, and more particularly from among the chlorinated derivatives of titanium and vanadium, for example titanium chloride and vanadium oxychloride. The reaction is carried out in the absence of solvent, by impregnation of the support with the halogenated derivative of the liquid transition metal, at a temperature between 50 and 160° C. over a period of not less than 30 minutes and preferably between 30 minutes and 2 hours, with relative quantities such that the solid support ranges from 5 to 25% by weight with respect to the liquid halogenated derivative. The product obtained may undergo one or more washings with the same halogenated derivative of liquid transition metal and one or more washings with a hydrocarbon solvent to eliminate any traces of transition compound which may be present. The product, which in the solid state takes the form of a suspension or fine dry powder, is then brought into contact with an aluminium trialkyl or a zinc dialkyl or a dialkyl halide of aluminium, the alkyl groups comprising 1 to 4 carbon atoms. The quantity of organometallic compound to be used is not critical so long as the compound is present in molar excess with respect to the transition metal which is fixed on the support, but it is preferable to work with molar ratios of metalorganic compound to fixed transition metal between 20 and 150. This bringing into contact is normally carried out in the presence of an inert hydrocarbon which must remain liquid under the conditions of polymerisation, at a temperature between 40 and 100° C. The catalytic system is used for the polymerisation of ethylene and the copolymerisation of ethylene with alpha-olefins and particularly for the production of ethylene polymers and copolymers of ethylene with propylene, and of ethylene with 1-butene, in which the ethylene is present to the extent of at least 90%. For this purpose, the monomer or monomers is or are introduced into the catalytic suspension in the form of gases or liquids at a pressure between atmospheric pressure and 35 atm. and at a temperature of 60 to 95° C. and preferably under conditions remote from saturation of the solvent. In the preferred form, a concentration is used which corresponds to between 20 and 40% by weight with respect to the values of saturation of the solvent at that temperature. Inert organic solvents which may for example be used are saturated aliphatic hydrocarbons and aromatic hydrocarbons, for example hexane, heptane, cyclohexane, benzene and toluene.

Since the support is prepared under conditions which are prefectly reproducible, it is possible to prepare catalysts, the behaviour of which is strictly constant and which yield polymers having constant properties.

The invention will now be illustrated by the following examples which are not however intended to constitute any limitation on the scope of the present invention.

EXAMPLE 1

50 g. of magnesium formate crystals with 2 molecules of water of crystallisation, obtained by treating magnesium carbonate with formic acid, are fluidised with 20 Nl./hr. of anhydrous nitrogen in a cylindrical reactor of 30 mm. diameter, 400 mm. tall and electrically heated. The reactor temperature was then raised to 280° C. at the rate of 20° C. per hour and kept at that level for 20 hours.

The magnesium formate crystals obtained, with a granulometry between 20 and 80 microns, were brought into contact with titanium tetrachloride of specific gravity 1.726, in a quantity ten times their weight, at a temperature of 140° C. for one hour in the presence of nitrogen with a water content below 10 p.p.m. After separation by filtration, washing with fresh titanium tetrachloride and finally with n-heptane to eliminate the free chlorine, and drying, the product obtained contained 1% by weight of titanium and 7.7% by weight of chlorine.

Into a 2-litre stainless steel alutoclave with a heat exchange liner, agitator, pressure gauge and thermometer sheath were placed 1 litre of anhydrous industrial heptane, 170 mg. of powder prepared in the manner described above and 450 mg. of aluminium triethyl.

Working at a temperature of 80° C., hydrogen was added to the autoclave until the pressure reached 5 kg./sq. cm., and then ethylene until the pressure reached 15 kg./sq. cm., these conditions being maintained for the next four hours by the continuous introduction of ethylene.

In this way, 73 g. of powdered polyethylene were obtained, to specifications as set out in Table 1.

EXAMPLE 2

The same procedure was adopted as in Example 1, using 50 g. magnesium formate crystals with 2 molecules of water of crystallisation.

However, in contrast to Example 1, activation was carried out in the presence of nitrogen with a moisture content equal to 8% by weight of the saturation level.

The solid obtained after treatment with titanium tetrachloride under the same conditions as in Example 1 contained 1.5% by weight Ti and 10.2% of chlorine. The ethylene was then polymerised according to Table 1 and as already described, still with regard to Example 1.

In this way, 90 g. of powdered polyethylene were obtained, having the properties described in Table 1.

EXAMPLE 3

100 g. magnesium acetate with 2 molecules of water of crystallisation were melted at 80° C. and passed through the nozzle of a spray drier maintained at a temperature of 150° C. by a stream of anhydrous nitrogen.

In this way, anhydrous magnesium acetate crystals were obtained with a granulometry between 10 and 100 microns.

After treatment with titanium tetrachloride as indicated in Example 1, a solid product was obtained containing 2% by weight of Ti and 89% by weight of chlorine. Applied to the polymerisation of ethylene according to Table 1 and as already described in Example 1, this product gave unsatisfactory results as described in Table 1.

EXAMPLE 4

50 g. of anhydrous magnesium acetate crystals obtained after spray drying as in Example 3 were fluidised with 20 Nl./hr. of anhydrous nitrogen in a tubular reactor such as that used in Example 1. The temperature of the reactor was then brought to 300° C. at the rate of 20° C. per hour and kept at that level for 20 hours.

After treatment with titanium tetrachloride as indicated in Example 1, the crystals gave rise to a solid product containing 0.9% by weight of titanium and 12% by weight of chlorine.

Applied to the polymerisation of ethylene according to Table 1 and as already described in Example 1, this product yielded the results described in Table 1.

EXAMPLE 5

50 g. magnesium oxalate with 2 molecules of water of crystallisation were placed in a rotating tubular oven to which anhydrous nitrogen was also fed.

The temperature of the oven was then raised to 340° C. at the rate of 20° C. per hour and kept at that level for 15 hours.

The crystals obtained, ranging in granulometry from 20 to 60 microns, were subjected to treatment with titanium tetrachloride as indicated in Example 1, giving rise to a solid product containing 0.6% Ti and 3.1% chlorine.

The ethylene was then polymerised as in Table 1 and as already described in Example 1. In this way, 55 g. of powdered polyethylene were obtained having the characteristic features described in Table 1.

EXAMPLE 6

50 g. of mixed potassium and manganese oxalate to formula $K_2C_2O_4 \cdot MgC_2O_4 \cdot 6H_2O$, obtained by atomisation of an aqueous suspension in granules of dimensions ranging from 20 to 80 microns, were placed in a rotating tubular oven to which dry nitrogen was also supplied.

The temperature of the oven was then raised to 200° C. at the rate of 20° C. per hour and kept at that level for 20 hours.

The dry product obtained in this way, after treatment with titanium tetrachloride as indicated in Example 1, contained 1.1% by weight of titanium and 9.2% by weight of chlorine.

Applied to the polymerisation of ethylene according to Table 1 and as already described in Example 1, this product gave the results described in Table 1.

EXAMPLE 7

30 g. magnesium oxalate with 2 molecules of water of crystallisation (decomposition point 380° C.) were fluidised with 20 Nl./hr. of dry nitrogen in a cylindrical reactor 30 mm. in diameter and 400 mm. high.

The temperature of the reactor was then brought to 500° C. at the rate of 50° C. per hour and kept at that level for 15 hours.

The resultant product was treated with titanium tetrachloride in a quantity equal to 10 times its weight for 1 hour at boiling.

The resultant product contained 11.3% Ti by weight and 27.96% by weight of chlorine.

Applied to the polymerisation of ethylene according to Table 1 and as already described in Example 1, the said product produced unsatisfactory results as described in Table 1.

TABLE 1

| Example number | 1 | 2 | 3 | 4 | 5 | 6 | 7 |
|---|---|---|---|---|---|---|---|
| Quantity of catalyst, mg./litre | 170 | 150 | 140 | 140 | 200 | 135 | 150 |
| Quantity AlEt₃, mg./l | 450 | 450 | 400 | 400 | 400 | 400 | 1,600 |
| Polymer obtained, g | 73 | 90 | 14 | 38 | 55 | 53.4 | 50.8 |
| Activity kg. polyethylene per g. of Ti | 43 | 40 | 5 | 30 | 46 | 36 | 3 |
| Melt index, g./10 mins | 0.65 | 0.8 | N.d. | 0.6 | 0.4 | 0.8 | N.d. |
| Melting point, °C | 131 | 131 | N.d. | 132 | 133 | 131 | N.d. |
| Specific gravity, g./ml | 0.961 | 0.960 | N.d. | 0.961 | 0.964 | 0.960 | N.d. |

EXAMPLE 8

Into a 3 litre stainless steel autocalve with a heat exchange liner, agitator, pressure gauge and thermometer sheath, were placed 1 litre of anhydrous industrial heptane, containing 160 mg. of the catalyst according to Example 1 and 450 mg. of aluminium triethyl.

At a working temperature of 80° C., propylene was added up to a pressure of 1 kg./sq. cm., and then ethylene up to a pressure of 11 kg./sq. cm.

These conditions were maintained for 4 hours, ethylene being supplied continuously.

In this way, 62.4 g. of ethylene-propylene copolymer were obtained, having the characteristic properties set out in Table 2.

EXAMPLE 9

Into an autoclave as in the previous example were placed 1 litre of anhydrous industrial heptane, containing 180 mg. of the catalyst according to Example 1 and 400 mg. of aluminium triethyl.

At a working temperature of 80° C., 1-butene was added up to a pressure of 1 kg./sq. cm. and then ethylene up to a pressure of 11 kg./sq. cm. These conditions were maintained for 4 hours, ethylene being supplied continuously. In this way, 63 g. of ethylene and 1-butene copolymer were obtained, having the characteristic properties set out in Table 2.

EXAMPLE 10

In an autoclave such as that in Example 8 were placed 1 litre of anhydrous industrial heptane containing 150 mg. of the catalyst of Example 5 and 200 mg. of aluminium triethyl. At the working temperature of 80° C., propylene was added up to a pressure of 1 kg./sq. cm. and then ethylene up to a pressure of 11 kg./sq. cm.

These conditions were maintained for 4 hours, ethylene being supplied continuously.

In this way, 36 g. of ethylene-propylene copolymer were obtained, having the properties set out in Table 2.

TABLE 2

| Example number | 8 | 9 | 10 |
|---|---|---|---|
| Quantity of catalyst, mg./l | 160 | 180 | 150 |
| Quantity AlEt₃, mg./l | 450 | 400 | 200 |
| Polymer obtained, g | 62.4 | 63 | 36 |
| Quantity alpha-olefins in the copolymer, percent by weight | 6.7 | 5.4 | 7.3 |
| Activity kg. of copolymer/g. of Ti | 39 | 35 | 40 |
| Melting point, °C | 123 | 120.5 | 122 |

What we claim is:

1. Process for the preparation of catalysts for the polymerization of ethylene and for the copolymerization of ethylene and an alpha-olefin, said catalyst consisting essentially of an organometallic compound selected from the group consisting of an aluminum trialkyl, a zinc dialkyl and a dialkyl halide of aluminum wherein each alkyl group contains 1 to 4 carbon atoms, and the product of inter-reaction of a halogenated derivative of a transition metal selected from the group consisting of chlorides, bromides and oxyhalides of metals of Groups IVB and VB of the periodic system, in the liquid state and a solid granular support, characterized by impregnating, at a temperature between 50 and 160° C., for a time not less than 30 minutes, with the liquid halogenated derivative of the transition metal the granular support, to form a support wherein said halogenated compound forms 5 to 25 percent by weight of the support, obtained by subjecting to an activation treatment a magnesium salt of an organic acid selected from the group consisting of magnesium oxalate, formate, lactate, tartrate, acetate, benzoate and citrate containing up to 5 molecules of water of crystallization, or a double alkali metal and magnesium salt of said organic acid containing up to 8 molecules of water of crystallization, the activation treatment consisting essentially of heating the magnesium salt or the double alkali metal and magnesium salt in a current of inert gas which is anhydrous or has a humidity not greater than 10 percent by weight of saturation, heating taking place gradually to a temperature at least 20–30° C., below the decomposition point of the salt and maintaining the salt at this temperature for 5 to 50 hours, said inter-reaction product of the halogenated derivative of the transition metal and the solid support being contacted with the organometallic compound in a relative amount such that the molar ratio of the organometallic compound to the transition metal fixed on the support is 20 to 150.

2. Process according to Claim 1, characterized in that the impregnation of the solid support is carried out for 30 minutes to 2 hours with an amount of the liquid halogenated derivative of the transition metal such that the solid support ranges 5 to 25% by weight of the liquid halogenated derivative of the transition metal.

3. Process according to Claim 1, characterised in that the halogenated derivative of the transition metal is a titanium chloride or a vanadium oxychloride.

4. Process according to Claim 1, characterised in that the halogenated derivative of the transition metal is titanium tetrachloride or vanadium oxychloride.

5. Process according to Claim 1, characterised in that the solid granular support is obtained by an activation treatment of a magnesium salt of an organic acid containing up to 5 molecules of water of crystallisation or of a double salt of an alkali metal and magnesium of an organic acid containing up to 8 molecules of water of crystallisation, this treatment comprising heating the said salts in such a manner that the temperature gradient is 5 to 50° C. per hour until a temperature at least 20 to 30° C. below the decomposition point of the salt is reached, in a current of an inert gas which is anhydrous or has a humidity content not greater than 10% by weight of saturation and maintaining the salts in this condition and at this temperature for 10 to 20 hours.

6. Process according to Claim 1, characterised in that the activation of the support is carried out in the presence of nitrogen, helium or argon.

7. Process according to Claim 1, characterised in that the double alkali metal and magnesium salt is the oxalate or tartrate.

8. Process according to Claim 1, characterised in that the organometallic compound is contacted with the interaction product of the halogenated derivative of the transition metal and the solid support in the presence of an inert hydrocarbon, which remains liquid under the polymerisation conditions at a temperature of 40 to 100° C.

9. Process according to Claim 8, characterised in that the inert hydrocarbon is pentane, hexane, cyclohexane, heptane, benzene, toluene or monochlorobenzene.

References Cited
UNITED STATES PATENTS

| | | | |
|---|---|---|---|
| 3,168,484 | 2/1965 | Engel et al. | 252—429 A |
| 3,454,547 | 7/1969 | Delbouille et al. | 252—429 C X |
| 3,676,414 | 7/1972 | Diedrich et al. | 252—429 C X |

PATRICK P. GARVIN, Primary Examiner

U.S. Cl. X.R.

260—949E